United States Patent
Ziai et al.

(10) Patent No.: US 6,976,205 B1
(45) Date of Patent: Dec. 13, 2005

(54) METHOD AND APPARATUS FOR CALCULATING TCP AND UDP CHECKSUMS WHILE PRESERVING CPU RESOURCES

(75) Inventors: Syrus Ziai, Sunnyvale, CA (US); Paul Jordan, Austin, TX (US); Craig Robson, Sunnyvale, CA (US); Ryan Donohue, Mountain View, CA (US); Fong Pong, Mountain View, CA (US)

(73) Assignee: Syrus Ziai, Sunnyvale, CA (US)

( * ) Notice: Subject to any disclaimer, the term of this patent is extended or adjusted under 35 U.S.C. 154(b) by 466 days.

(21) Appl. No.: 09/962,724

(22) Filed: Sep. 21, 2001

(51) Int. Cl.[7] ............................................. H03M 13/09
(52) U.S. Cl. ..................................................... 714/807
(58) Field of Search ........................................ 714/807

(56) References Cited

U.S. PATENT DOCUMENTS

| | | | | |
|---|---|---|---|---|
| 4,991,133 A | * | 2/1991 | Davis et al. ................. | 709/234 |
| 5,430,842 A | * | 7/1995 | Thompson et al. ........ | 709/236 |
| 5,500,864 A | * | 3/1996 | Gonia et al. ................ | 714/807 |
| 5,638,370 A | * | 6/1997 | Seconi et al. ............... | 370/466 |
| 5,790,786 A | * | 8/1998 | Wakeman et al. .......... | 709/249 |
| 5,826,032 A | * | 10/1998 | Finn et al. ................... | 709/236 |
| 5,898,713 A | * | 4/1999 | Melzer et al. ............... | 714/807 |
| 5,937,169 A | * | 8/1999 | Connery et al. ............. | 709/250 |
| 6,032,253 A | * | 2/2000 | Cashman et al. ........... | 712/300 |
| 6,173,333 B1 | * | 1/2001 | Jolitz et al. .................. | 709/240 |
| 6,226,680 B1 | | 5/2001 | Boucher et al. | |
| 6,226,771 B1 | * | 5/2001 | Hilla et al. .................. | 714/758 |
| 6,247,060 B1 | | 6/2001 | Boucher et al. | |
| 6,279,140 B1 | * | 8/2001 | Slane .......................... | 714/807 |
| 6,289,023 B1 | * | 9/2001 | Dowling et al. ............. | 370/419 |
| 6,310,884 B1 | * | 10/2001 | Odenwald, Jr. ............. | 370/412 |
| 6,345,302 B1 | * | 2/2002 | Bennett et al. ............. | 709/236 |
| 6,389,479 B1 | | 5/2002 | Boucher et al. | |
| 6,427,171 B1 | | 7/2002 | Craft et al. | |
| 6,427,173 B1 | | 7/2002 | Boucher et al. | |
| 6,434,620 B1 | | 8/2002 | Boucher et al. | |
| 6,470,415 B1 | | 10/2002 | Starr et al. | |
| 6,530,061 B1 | * | 3/2003 | Labatte ....................... | 714/807 |
| 6,629,288 B1 | * | 9/2003 | Bernath et al. ............. | 714/807 |
| 6,631,488 B1 | * | 10/2003 | Stambaugh et al. ........ | 714/746 |
| 6,647,528 B1 | * | 11/2003 | Collette et al. ............. | 714/758 |

OTHER PUBLICATIONS

Syrus Ziai, et al., "Method and Apparatus For Calculating TCP and UDP Checksume While Preserving CPU Resources", U.S. Appl. No. 09/962,724, filed on Sep. 21, 2001, paragraphs [0002]-[0019] pp. 2-8.

A. Rijsinghani, "Computation of the Internet Checksum Via Incremental Update", Network Working Group, Update 1141, Informational Catatory, May 1994, pp. 1-6. Printed from http://ww.ietf.org/rfc/rfc, 1624.txt.

* cited by examiner

*Primary Examiner*—Stephen M. Baker
(74) *Attorney, Agent, or Firm*—Blakely, Sokoloff, Taylor & Zafman, LLP

(57) ABSTRACT

A method is described that involves performing a checksum calculation on a section of data within an inbound packet before the section of data is first stored into a system memory. Another method is described that involves moving a section of data within an outbound packet from a system memory to an offload memory. Then, removing the section of data from the offload memory; and performing a checksum calculation on the section of data. An apparatus is described that includes a central processing unit that is communicatively coupled with a network processing offload unit, wherein the network processing offload unit calculates a checksum upon a section of data located within an inbound packet, and calculates a checksum upon a section of data within an outbound packet.

19 Claims, 15 Drawing Sheets

METHOD AND APPARATUS FOR CALCULATING TCP AND UDP CHECKSUMS WHILE PRESERVING CPU RESOURCES

FIELD OF INVENTION

The field of invention relates to networking, generally; and, more specifically, to a method and apparatus for calculating TCP and UDP checksums while preserving CPU resources.

BACKGROUND a. TCP and UDP Checksums

A number of different packet based protocols have been defined to enable interconnected systems to communicate with each other. For example, the Internet Protocol (IP) defines a networking layer protocol that allows packets to be routed, switched, or otherwise passed from network node to network node as they progress from a source point to a destination point within an IP network. At the transport layer, the Transmission Control Protocol (TCP) or the User Datagram Protocol (UDP) may be used to control the flow of packets from a source point to a destination point. TCP is a connection oriented protocol while UDP is a datagram oriented protocol. Either may be viewed as a transport layer protocol that can be configured to "run on top of" the IP protocol.

FIG. 1a examines this in more detail. FIG. 1a shows how a packet may be constructed (by moving downward along the Transmitting Direction of FIG. 1a) prior to its being transmitted into a network (e.g., an Ethernet network) and/or how a packet may be broken down (by moving upward along the "Receiving Direction" of FIG. 1a) after its reception from a network. The embodiment(s) illustrated in FIG. 1a therefore correspond to an IP packet being transported using the UDP or TCP protocol.

Referring to FIG. 1a, moving along the transmitting direction, application data 101a (e.g., the data that corresponds to the packet's "payload") is encapsulated by a UDP header 102a or a TCP header 102b. For simplicity, the term "TCP/UDP" is utilized in FIG. 1a to express that either TCP or UDP may apply. FIG. 1b shows a detailed embodiment of a UDP header 102a that is prefixed (or prepended) to the application data 101a; and, FIG. 1c shows a detailed embodiment of a TCP header 102b that is prefixed to application data 101a.

The UDP header embodiment 102a of FIG. 1b divides the header into four fields 110b, 103b, 104b, 106b. These fields identify the source port 104b of the packet, the destination port 103b of the packet, the UDP message length 106b, and a UDP checksum value 110b. A port is typically associated with each uniquely identifiable agent (e.g., a particular application, a particular user, a particular object, etc.) that uses an IP network. Ports are often viewed as the ultimate sources and/or destinations of the packets that traverse an IP network.

A single IP node (e.g., a source IP node or a destination IP node) may be configured to support multiple ports. Thus, for example, a group of packets that are directed to a particular IP destination node may be ultimately delivered to different agents that each view the destination IP node as their access point to the IP network.

Commonly, multiple ports are associated with the same machine (e.g., a computing system) wherein the machine has a specific IP address. For example, a server may have a specific IP address and the application programs running on the server may each be identified with a different port. This allows the different application programs to establish different flow arrangements with the IP network (via the TCP or UDP headers) while sharing the same access point to the IP network (via the network resources of the server and its corresponding IP address).

The TCP header embodiment 102b of FIG. 1c divides the header into a plurality of fields which identify: 1) a source port 105c; 2) a destination port 106c; 3) a sequence number 107c; 4) an acknowledgment number 104c; and 5) a TCP checksum value 110c (among other parameters such as header length, control, window, etc.). As the TCP protocol is connection oriented, it includes both a sequence number 107c and an acknowledgment number 104c so that two agents in communication with one another across an IP network can ensure that the order of packets associated with the connection between them is preserved.

Referring back to FIG. 1a, note that a UDP header 102a or a TCP header 102b is prefixed to the application data 101a. This combination may be referred to as the UDP packet 109a or TCP packet 109b, respectively. A UDP pseudo header 112a or a TCP pseudo header 112b may then be created and prefixed to the UDP packet 109a or TCP packet 109b, respectively. The pseudo header 112a, 112b is used to calculate the checksum value 110b, 110c found within the UDP or TCP headers. An embodiment of a UDP pseudo header 112a or a TCP pseudo header 112b is observed in FIG. 1d.

A checksum is a number whose value represents the particular sequence of bits found within a block of data. As such, two identical blocks of data have the same checksum; and, two different blocks of data statistically have two different checksum values. In typical embodiments, the UDP/TCP pseudo header 112a, 112b, the UDP/TCP header 102a, 102b and the application data 101a are together viewed as the "block" of data over which the checksum is calculated. This "block" of data is effectively viewed as a succession of 16 bit integers that are summed using one's complement logic.

The end result of this addition is the checksum value 110b, 110c that is stored in the UDP/TCP header 102a, 102b of FIGS. 1b and 1c. Note that, for the checksum calculation process, a string of 0s is typically used to represent the header checksum value 110b, 110c; and, the pseudo header 112a, 112b may be "padded" as appropriate with zeros (via the zero field 154 of FIG. 1d) so that the "block" of data is evenly divided into fixed length (e.g., 16 bit) sections.

As seen in FIG. 1d, the pseudo header 112a, 112b includes IP source and destination fields 150, 151 as well as a length indicator 152, an IP Protocol Type indicator 153 and the zero padding field 154. As the IP source and destination of a packet may differ from packet to packet; and, as the application data may differ from packet to packet, different checksum values are expected for packets having a different IP source/destination pair and/or different application data content. Referring back to FIG. 1a, once the checksum value is calculated and inserted into the UDP/TCP header 102a, 102b, an IP packet 120a is formed by discarding the pseudo header 112a, 112b and appending an IP header 103a to the UDP/TCP packet 109a, 109b.

The IP packet 120a is then presented to the particular physical media network type (e.g., Ethernet) that interconnects the sending node to the "next" node in the network. Note that in FIG. 1a, an Ethernet header 104a and trailer 111a is shown as an example of how an Ethernet packet may be constructed to carry the IP packet through an Ethernet network.

Once received at its destination, the packet is deconstructed. Moving upward in FIG. 1a along the receiving path direction, after the IP header 103a is removed, another pseudo header 112a, 112b is created (using the IP address of the destination device) and prefixed to the UDP/TCP packet 109a, 109b. The checksum that was received in the UDP/TCP header 102a, 102b may then be removed (so it can be used for comparative purposes as discussed below) and replaced with a string of 0s.

In at least one approach, the checksum is then re-calculated over the course of the pseudo header 112a, 112b, UDP/TCP header 102a, 102b, and application data 101a. The checksum calculated at the destination is then compared with the checksum that was extracted from the UDP/TCP header 102a, 102b. If the checksums match, there is a high probability that the data was not corrupted during transmission and the packet is "accepted"; otherwise, it is discarded.

In alternate approaches, the property of 1's complement addition (where X+X'=0) is taken advantage of such that the checksum is calculated over the data and the checksum. If the final answer is "0", the checksum is deemed "good." Other types of checksum approaches that are known or yet to be developed may also be used.

b. Software Calculation of the TCP and UDP Checksums

FIG. 2 shows an embodiment of a Central Processing Unit (CPU) 200 found within a computing system. A CPU 200a is responsible for executing software for the machine or device having the CPU 200a. A CPU typically comprises, as seen in FIG. 2, one or more processors 201a which are coupled to a system memory 202a (e.g., through a memory controller 203a as observed in FIG. 2). Note that other CPU architectures may exist that are different than that depicted in FIG. 2. For example, in distributed computing environments, a plurality of processor units is typically coupled to one or more system memory units.

In order to implement the software methodologies that execute on a CPU 200, the processor(s) 201 typically execute a plurality of instructions and manipulate a plurality of data units. The instructions and data units are found in either (or both) the system memory unit 202a and the cache unit 206a. Generally, frequently used (and/or imminently used) instructions and data units are stored in the cache unit 206a. As a result, the instruction execution logic of the processor(s) 201a has this information "nearby" so as to avoid the delay associated with retrieving it from system memory 202a. System memory 202a is typically implemented with Dynamic Random Access Memory (DRAM) cells (which are more dense but slower) while the cache unit 206a is typically implemented with Static Random Access Memory (SRAM) cells (which are less dense but faster).

In the prior art the TCP and/or UDP functionality, which includes the TCP and UDP checksum calculations described above, is implemented in software. As such, the checksum calculation process is executed via the execution of instructions and the manipulation of data units that reside in system memory 202 and/or cache 206. The intensive operations associated with the calculation of a checksum tend to hinder the performance of the CPU 200. That is, the repeated additions of fixed length sections of the application data, UDP/TCP header and pseudo header consume the resources of the system memory 202, and execution instruction logic and "pollute" the cache 206 within the processors 201 such that resources the CPU 200 can devote to other functions (e.g., application programs) is noticeably reduced.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments of the present invention (as described below as well as others) may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Figure 3:
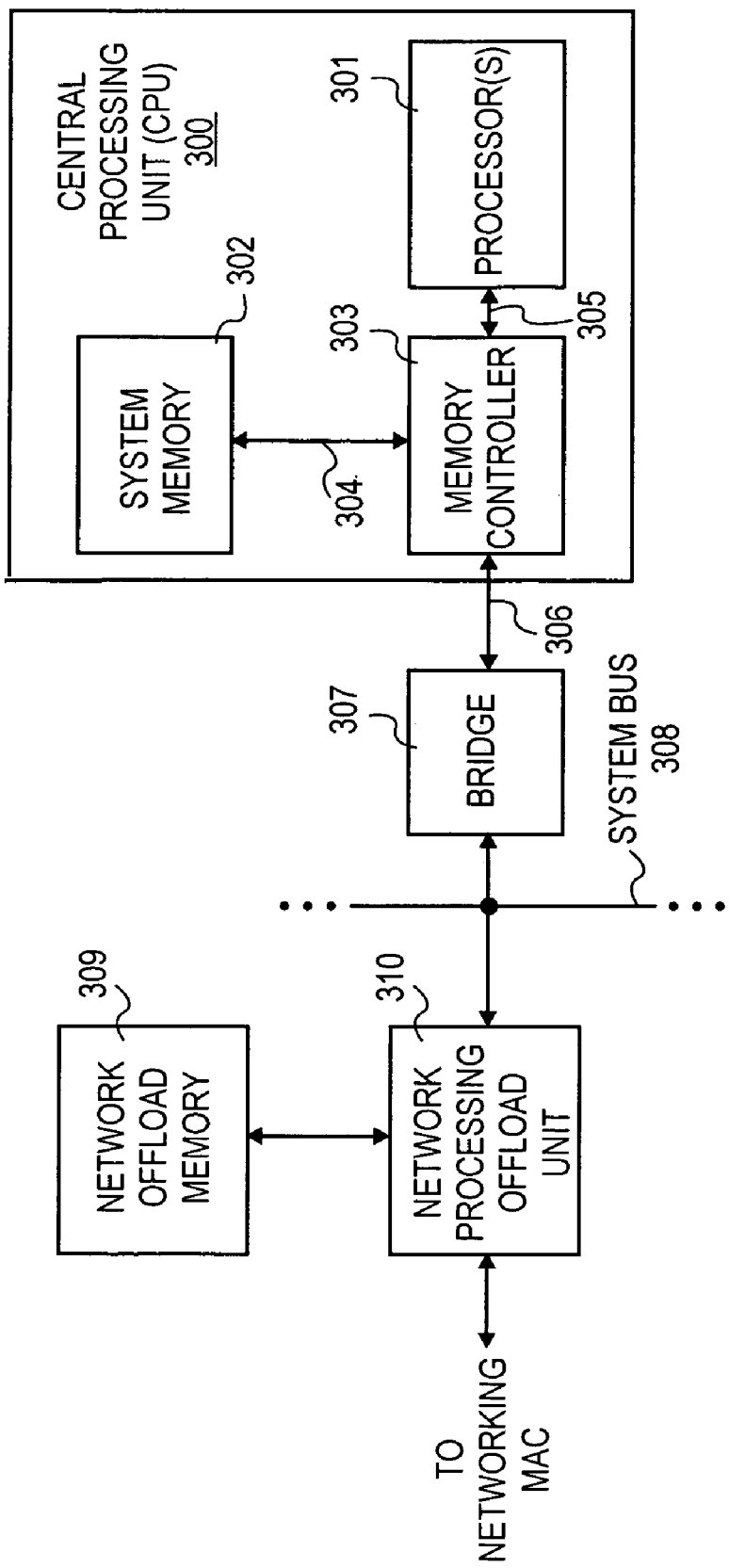
FIG. 3 shows an embodiment of a network offload processing unit coupled to a CPU.

FIG. 3 shows an embodiment of an improved system architecture that allows for UDP and TCP checksums to be calculated outside the CPU 300. In particular, the UDP and TCP checksums are calculated within a network processing offload unit 310 (which makes use of a network offload memory 309). Because the checksum calculations are performed by the networking processing offload unit 310, the CPU's resources are preserved. As a result, the CPU 300 may devote more resources to other tasks than it otherwise could have if the checksum calculations were to be performed by the CPU 300 alone.

For simplicity, most of the following discussion refers to embodiments wherein checksums are calculated within the network processing offload unit 310; and, the remainder of the IP and TCP or UDP processing burden is executed by the CPU 300 with software routines. As such, the term "packet" as used below may be construed as referring to a body of data that includes an IP layer header, a UDP or TCP layer header and application data. The term UDP packet or TCP packet refers to a packet without the IP layer header.

Figure 12:
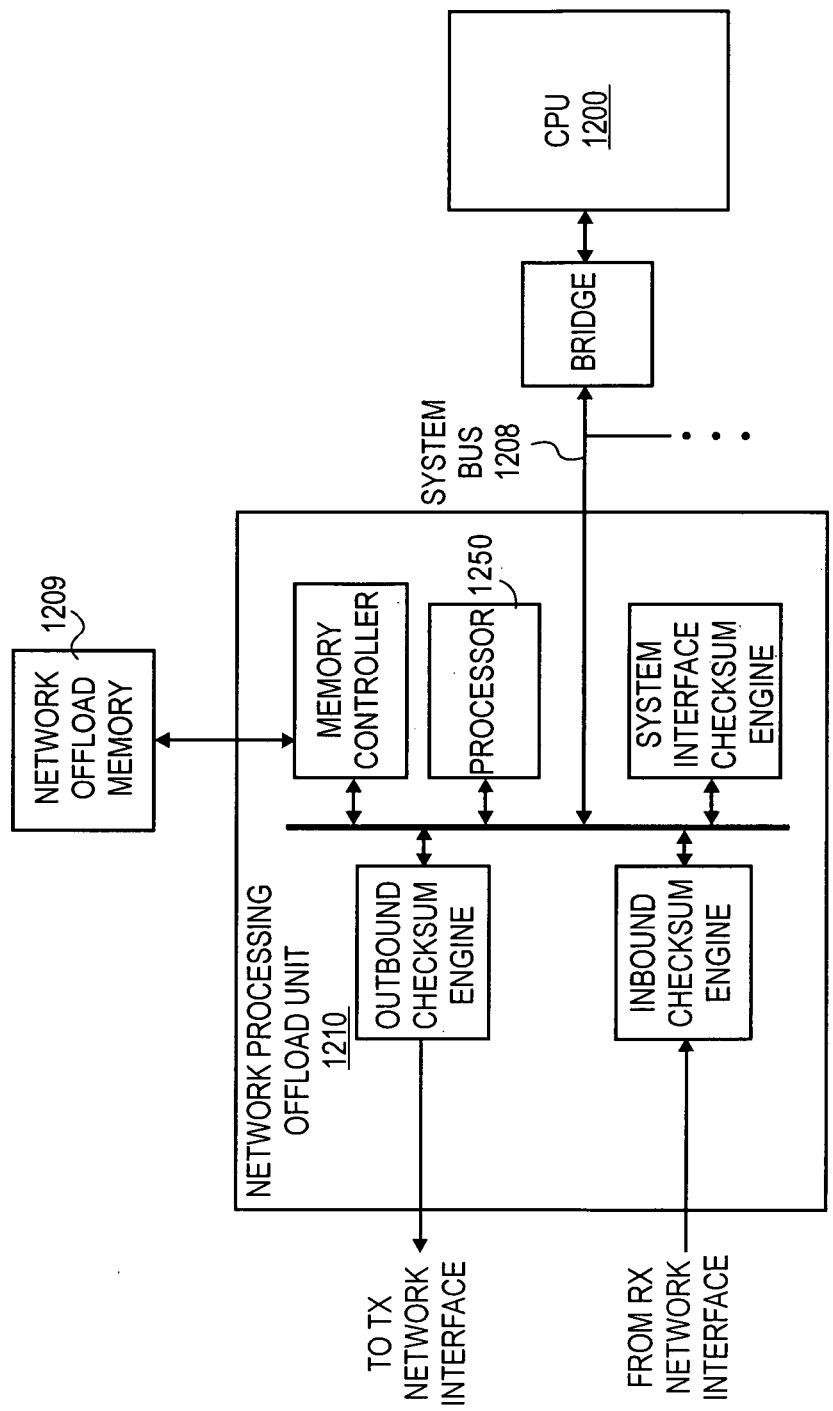
FIG. 12 shows an embodiment of a network offload processing unit having a processor.

FIG. 12 introduces an alternate embodiment where the IP and TCP or UDP processing burdens are executed by a processor that is embedded within the networking processing offload unit 1210 so that even more of the processing burden associated with networking protocol implementation can be shifted from the CPU 1200. A network processing offload unit 1210 may therefore be viewed as any logic, circuitry, processing core, etc. (or combination thereof), other than the CPU 1200, that performs one or more functional processes (such as a checksum) that are used or needed to execute one or more networking protocols.

Referring to the FIG. 3, note that the CPU 300 is communicatively coupled to the network processing offload unit 310 via a system bus 308 and a system bridge 307. A system bus 308 helps couple various architectural components of a computing system that provide or accept information to or from the CPU 300 (e.g., I/O devices such as a hard drive unit, a diskette drive unit, a graphics display, a networking interface, etc.). In an embodiment, the system bus 308 corresponds to a Peripheral Component Interface (PCI) bus, however other bus types are possible such as Hypertransport, Infiniband, etc. It is also important to note that system bus types that have not been developed and/or standardized as of the time of filing of the present application may be used in future embodiments.

A bridge device such as the system bridge device 307 of FIG. 3 is commonly used to "bridge" two different busses (or other type of communication means such as a serial link) together so that cooperative communication may take place from bus to bus (or communication means to communication means). As such, with respect to the embodiment of FIG. 3, the system bridge device 307 of FIG. 3 bridges the system bus 308 to the memory controller bus 306.

The memory controller 303 embodiment of FIG. 3 may be viewed as having three interfaces: 1) a memory controller bus 306 that entertains requests and/or demands for the system memory 302 (including direct memory accesses (DMAs)) that arise from architectural components outside the CPU 300 (e.g., the aforementioned I/O devices); 2) a processor bus 305 that entertains requests and/or demands of the system memory 302 that arise from the processor(s) 301 within the CPU 300; and 3) a system memory interface 304 that performs read and/or write operations upon the system memory 302 in response to the aforementioned requests and/or demands.

The memory controller 303 and system bridge 307 may be implemented in various ways. For example, according to at least a few different approaches, the memory controller 303 is implemented as one or more semiconductor chips from the "chipset" product offering(s) of Intel Corporation of Santa Clara, Calif. (e.g., '440BX, '820, etc.).

In alternate embodiments, the memory controller 303 is implemented as a commercial product offering from another semiconductor chip supplier or as a proprietary solution. Note also that the system bridge 307 and the memory controller 303 can be effectively merged in various other embodiments (e.g., such that a system bus 308 emerges from the CPU 300).

The system memory interface 305 may be embodied with various current technologies such as Synchronous DRAM (SDRAM); Double Date Rate DRAM (DDR); and Rambus DRAM (RDRAM) to name a just a few. Proprietary interfaces may be used; and, with regard to future embodiments, standard interfaces yet to be defined may also be used.

In the particular system architecture embodiment of FIG. 3, the network offload processing unit 310 may be said to be "communicatively coupled" to the CPU 300 via the system bridge 307. That is, the network offload processing unit 310 can make requests and/or demands for the system memory 302. It is important to note that system architectures other than the system architecture outlined in FIG. 3 may be devised wherein a network offload processing unit 310 is communicatively coupled to a CPU (e.g., via direct communication with a memory controller as just one example). As such, embodiments of the present teachings should be understood to include system architectures that differ from that observed in FIG. 3.

Figure 4:
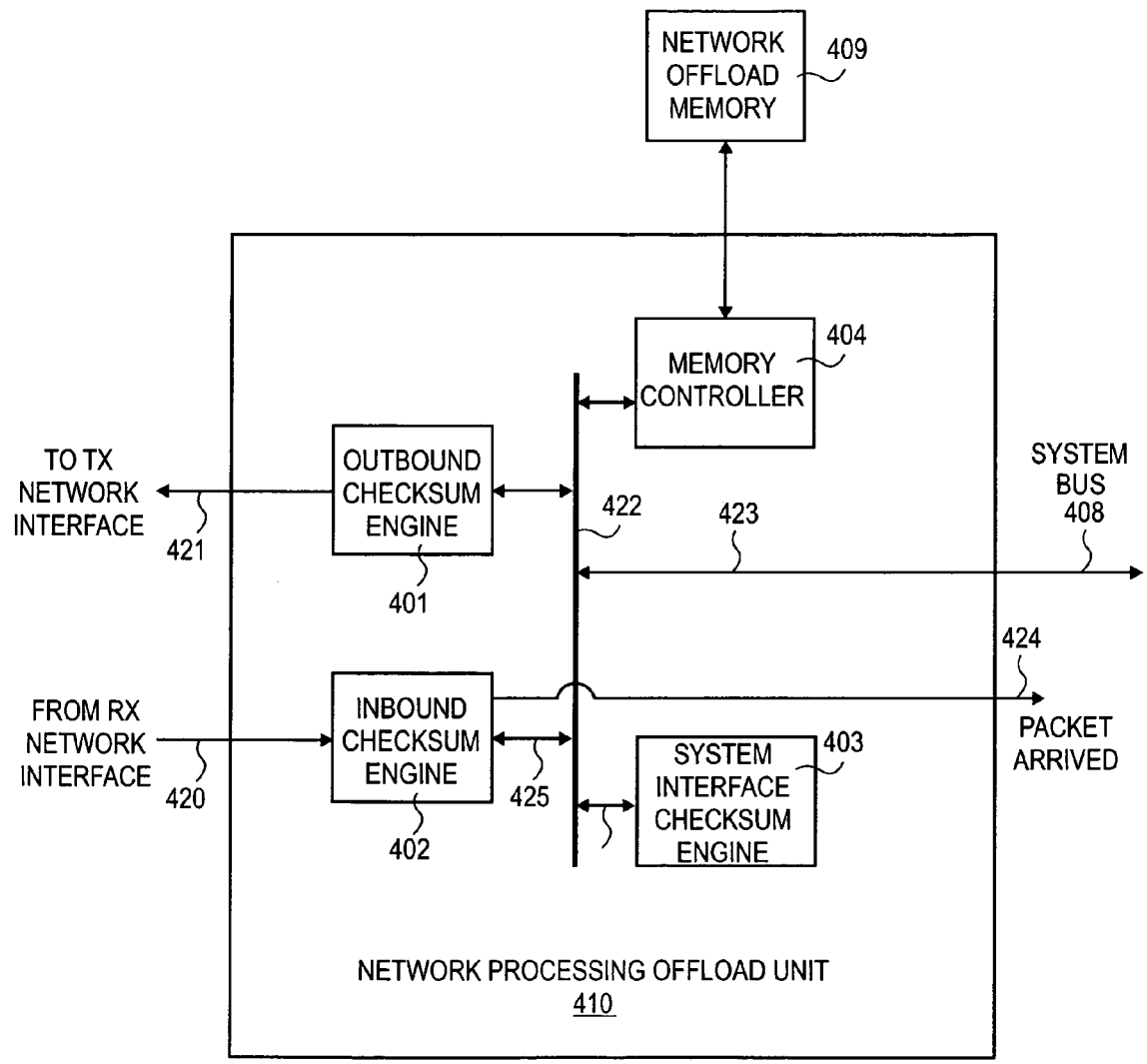
FIG. 4 shows an embodiment of the network offload processing unit of FIG. 3.

FIG. 4 shows an embodiment 410 of an architecture that may be used for the network processing offload unit 310 of FIG. 3. As seen in FIG. 4, the network processing offload unit 410 can be designed to include a trio of checksum engines 401, 402, 403. A checksum engine calculates a checksum on an applicable "block" of data. As appropriate, this can include: 1) the addition of a pseudo header to a UDP or TCP header and application data payload prior to the calculation of a checksum for a TCP packet or a UDP packet, respectively; 2) the removal of the checksum from the checksum portion 110*b*, 110*c* of the TCP or UDP packet (referring briefly to FIGS. 1*b* and 1*c*); the 3) the insertion of a field of 0s in its place; 4) the padding of the pseudo header; 5) the subsequent removal of the pseudo header after checksum calculation; and 6) the re-insertion of the received checksum value back into the checksum portion of the inbound packet's transport layer header.

Note that a pseudo header may be built with information that is, where appropriate, extracted from the packet itself (e.g., the source IP address 150 of FIG. 1*d* for inbound) or provided by the network processing offload unit via the CPU (e.g., the destination IP address for outbound). The later information may be stored, for example, within register space associated with the inbound checksum engine 402 or the network processing offload unit 410, generally.

Figure 5:
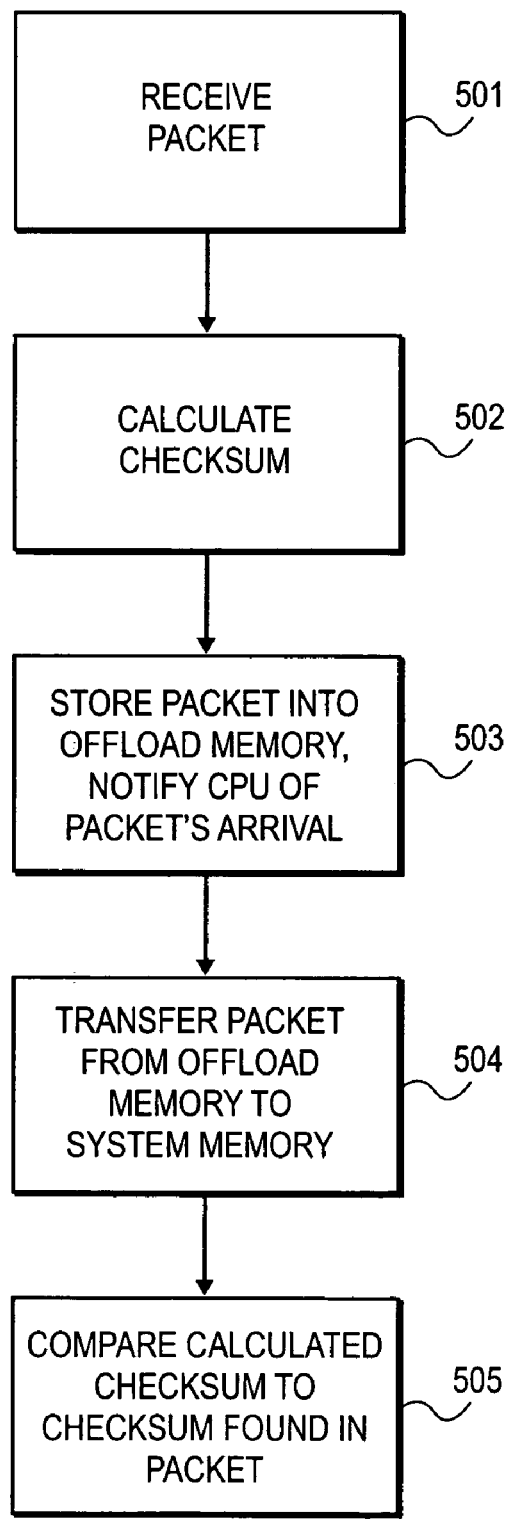
FIG. 5 shows a methodology for calculating a checksum for an inbound packet.

In an embodiment, the inbound checksum engine 402 performs checksum calculation on an inbound TCP or UDP packet (i.e., a TCP packet or UDP packet that has been received). Referring to FIGS. 4 and 5, an inbound packet is received 501 and provided to the network offload processing unit 410 at the RX network interface 420 which results in the presentation of the packet to the inbound checksum engine 402. The inbound checksum engine 402 calculates 502 the checksum for the inbound packet.

After or during calculation 502 of the checksum, the inbound packet is stored 503 within the network offload memory 409. For example, earlier bytes of the application data that have already been processed by the checksum calculation process may be stored into the network offload memory 409 while later bytes of the application data from the same packet are incorporated into the checksum calculation process or wait to be incorporated. Alternatively, an inbound packet can have its checksum calculated before any of its bytes are written into the network offload memory 409.

In an embodiment, once a checksum value is calculated, the CPU is notified 503. The calculated checksum value may be appended to the inbound packet within the network offload memory 409. Alternatively or in combination, the calculated checksum may be stored within a register located within the network processing offload unit 410 (e.g., within the inbound checksum engine 402). In the former case, the CPU receives the checksum by reading the inbound packet out of the network offload memory 409 (because the checksum, being appended to the packet, travels along with the packet). In the latter case, the CPU receives the checksum by invoking a read from the register where the checksum is stored.

The CPU may be notified that a packet has arrived in various ways such as a status line 424 that goes active upon the completion of the checksum calculation process (which can be polled by the CPU processor(s) or, alternatively, directed to an interrupt input to the CPU processor(s)). The status line 424 can be separate from (or integrated into) the interface 408 to the system bus. Other ways of signaling an event to a CPU may be used instead of those described just above as well. Note that the notification 503 may occur before, in parallel with, or after the packet has been written into the network offload memory 409.

Once the CPU becomes aware that a packet has arrived and decides to move the packet from the network offload memory 409, the packet is transferred 504 from the network offload memory 309, 409 to the system memory 302 (referring to FIGS. 3, 4 and 5, respectively). The manner in which the inbound packet is transferred may take various forms. For example, in one approach, the memory controller 404 of the network processing offload unit 410 manages a DMA write operation into the system memory 302. From this point, transport layer protocol processing (e.g., TCP processing on a TCP packet or UDP processing on a UDP packet) can be continued in software that is executed by the CPU 300.

A preliminary methodology of the software can be to compare 505 the checksum value of the packet (which can be found in the system memory within the transport layer header of the packet) with the checksum value that was calculated by the inbound checksum engine 402. If they match, the packet may be deemed "accepted"; or, if they do not match, the packet may be deemed "not accepted" (and discarded from system memory 302 as a result).

In order to compare the packet's checksum value with the calculated checksum value: 1) the checksum value of the packet can be retrieved from the system memory 302 (e.g., by reading the packet's header information); and, 2) if the calculated checksum value is appended to the packet, the calculated checksum value can also be retrieved from system memory 302 (e.g., along with the packet's checksum value), or alternatively, the calculated checksum value can be retrieved from appropriate register space (e.g., within the network processing offload unit 410). Regardless, note that the packet's application data payload does not need to be read from the system memory 302 and processed by the CPU 300 for checksum calculation purposes. As such, CPU 300 resources are conserved and can be devoted to other tasks. In addition, the cache memory on the CPU is not polluted by the data used to calculate the checksum for the packet.

Figure 6:
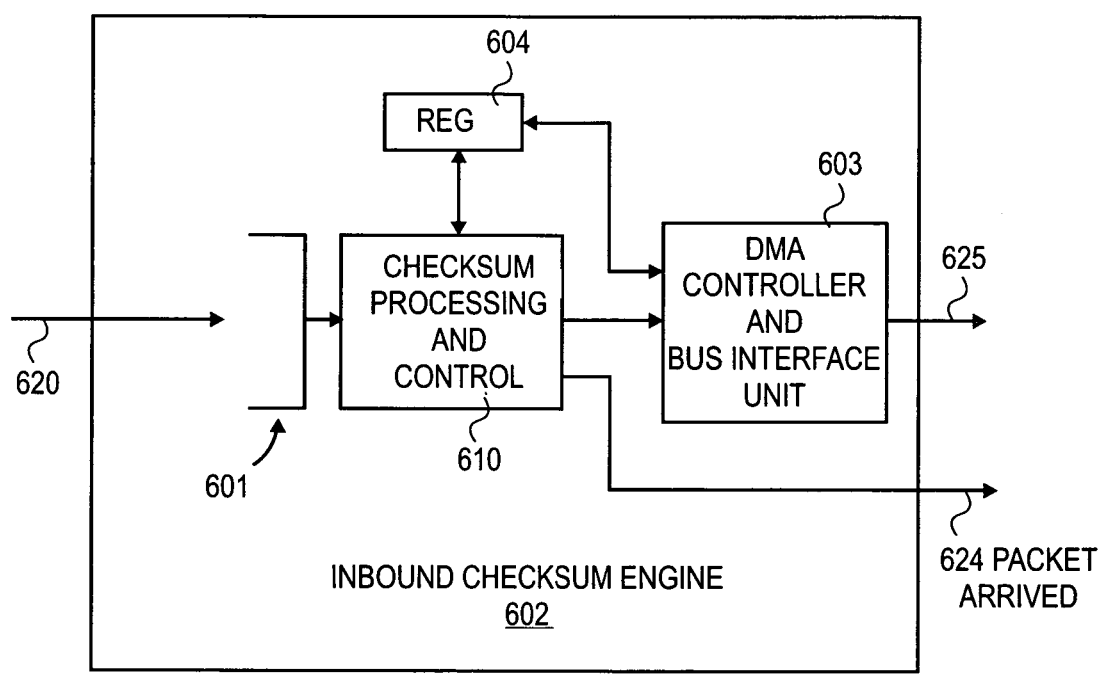
FIG. 6 shows an embodiment of the inbound checksum engine of FIG. 4.

FIG. 6 shows an example of a more detailed embodiment 602 that may be used to implement the inbound checksum engine 402 of FIG. 4. According to the exemplary design of FIG. 6, the inbound checksum engine 602 includes an inbound queue 601, checksum processing and control logic 610, a DMA controller and bus interface unit 603, and a register 604. The inbound queue 601 may be designed as a first-in-first-out (FIFO) queue that can store a number "n" of inbound packets. The checksum processing and control logic 610 performs the checksum processing on the packet.

Register 604 stores the checksum value calculated by the inbound checksum engine 602. The checksum processing and control logic 610 can be designed to alternatively store the calculated checksum value into the register 604 or append the calculated checksum value to the inbound packet (e.g., as indicated by preference of the CPU); or may be designed do both (i.e., store the calculated checksum value into the register 604 and append the calculated checksum value to the inbound packet) at the request of the CPU or as an automatic function.

Referring to FIGS. 4 and 6, the DMA controller and bus interface unit 603 manages the writing of an inbound packet into the network offload memory 409. As such, the packet is written via DMA by a DMA controller portion of unit 603. In alternate embodiments, the DMA portion is non-existent (such that unit 603 performs mostly bus interface services) and the packet is written into the network offload memory unit 409 via: 1) a request made to the memory controller 404; and 2) a subsequent transferal of the packet from the inbound checksum engine 602 to the network offload memory 409 by the memory controller 404 in response. Other transfer mechanisms and approaches are also possible.

Note that the embodiment of FIG. 4 continues the system bus 308 of FIG. 3 into the networking processing offload unit 410 of FIG. 4. That is, the networking processing offload unit 410 incorporates a bus 422 architecture so that the checksum engines 401, 402, 403 are communicatively coupled to the network offload memory 409 (and/or CPU as needed). In the particular case of FIG. 4, the network processing offload unit bus 422 is an extension of the system bus 308, 408 of FIGS. 3 and 4 respectively.

In alternate embodiments, a bridge unit (or other type of bus-to-bus translation unit) may be inserted between the networking processing offload bus 422 and the interface to the system bus 408 (e.g., along signaling leg 423) so that the networking processing offload unit bus 422 may operate in relative isolation with respect to the system bus 408. In a further related embodiment, the bridge unit (or other translation device) is integrated into the system interface checksum engine 403.

In alternate embodiments, the network processing offload unit 410 may be designed without a central bus 422 (e.g., by wiring point-to-point communication between the functional unit 401 through 404 of the network offload processing unit 410). Further still, other architectures are possible as well (e.g., by giving the system interface checksum engine 403 its own unique interface to the system bus 408).

Figure 7:
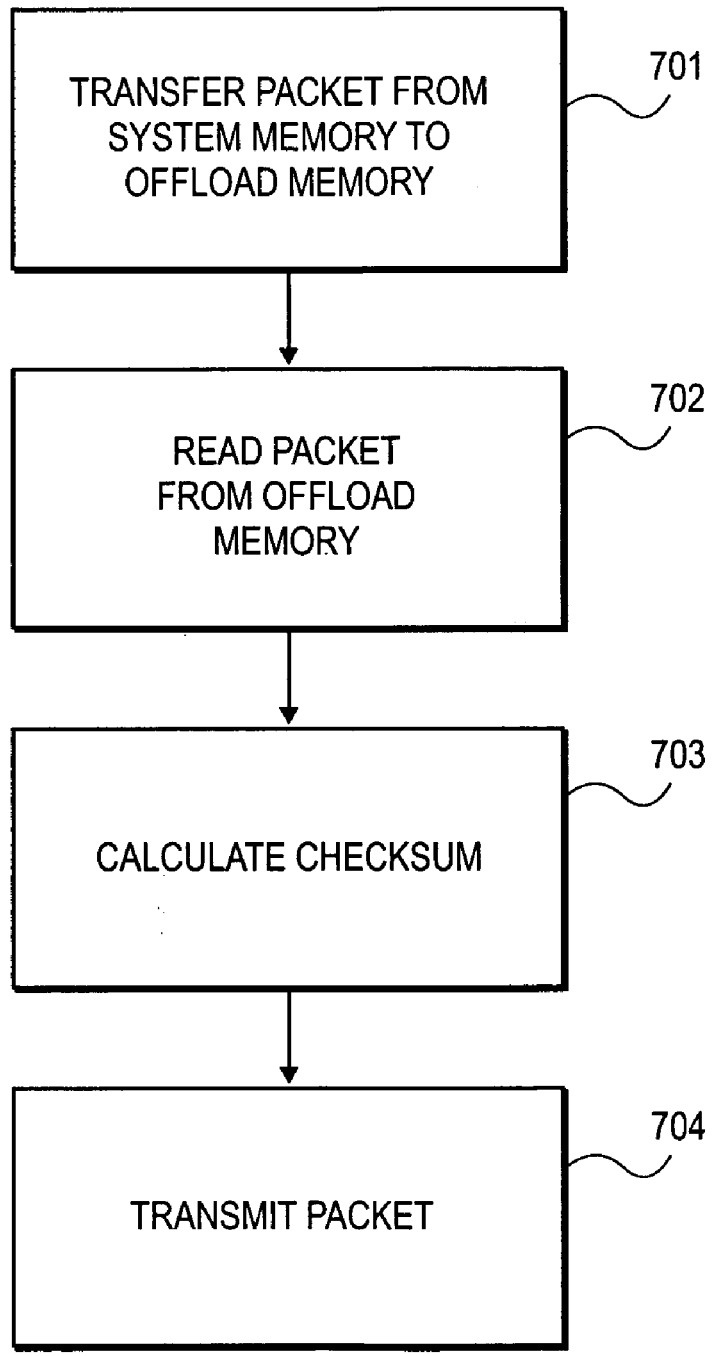
FIG. 7 shows a methodology for calculating a checksum on an outbound packet.

The above discussion applied to inbound packets. FIG. 7, however, refers to an embodiment as to how a network processing offload unit 310 and network offload memory 309 (as observed in FIG. 3) may be used to assist in the transmission of outbound packets from a CPU 300 toward a network. As an example, the network processing offload unit embodiment 410 of FIG. 4 will be used as an underlying architecture that can execute the methodology observed in FIG. 7.

Referring to FIGS. 3, 4 and 7, a packet is transferred 701 from the system memory 302 to the network offload memory 309, 409. In an embodiment, the packet corresponds to an IP packet. That is, the CPU 300 executes IP and TCP/UDP related software so that an appropriate IP and TCP/UDP header can be added to the application data of the packet. The transfer can be done in various ways such as a DMA managed by a memory controller 404 associated with the network processing offload unit 410 or a DMA managed by a memory controller 303 associated with a CPU 300.

The packet is then read 702 from the network offload memory 409 and presented to an outbound checksum engine 401 which calculates 703 the checksum for the outgoing packet. Note that the outbound packet may be read 702 from the network offload memory 409 before or during the calculation 703 of the checksum. For example, later bytes of the application data that have not been incorporated into the checksum calculation process may be read from the network offload memory while other earlier bytes of the application data from the same packet are being (or have been) incorporated into the checksum calculation process.

Alternatively, a packet can have its checksum calculated after it has been read in its entirety from the network offload memory 409. After the outbound checksum engine 401 engine calculates the checksum 703 on the outgoing packet, the outbound packet is forwarded to the outbound network interface 421. The packet is then transmitted 709.

Figure 8:
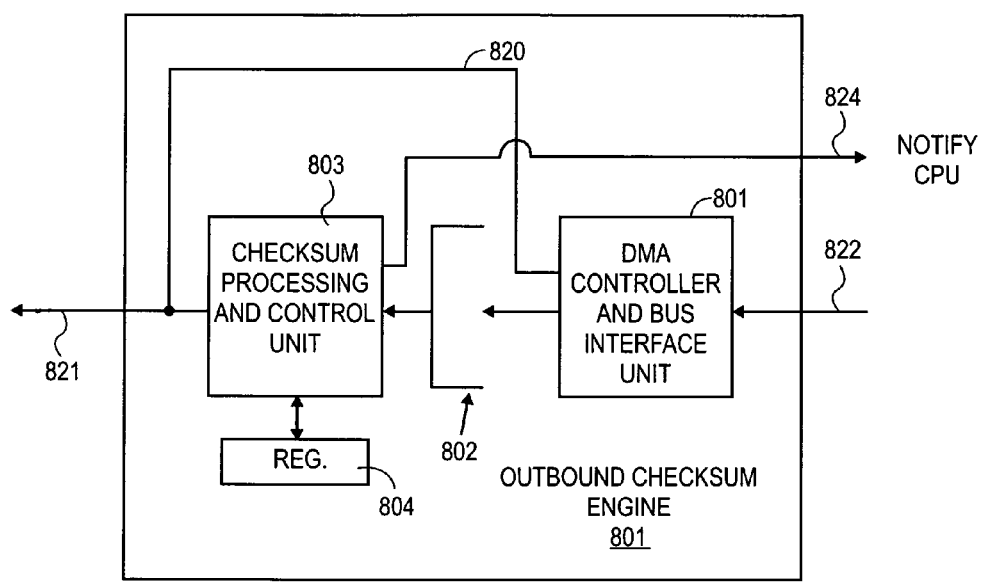
FIG. 8 shows an embodiment of the outbound checksum engine of FIG. 4.

FIG. 8 shows an embodiment 801 of a design that may be used for the outbound checksum engine 401 of FIG. 4. According to the approach of FIG. 8, an outbound packet can be read from the network offload memory via a DMA executed under the control of a DMA control and bus interface unit 801. The packet (or pieces thereof) is then forwarded to an outbound queue 802 which, for example, can be designed to hold up to "n" outbound packets (or pieces of outbound packets). The checksum processing and control unit 803 calculates the checksum for the packet and releases the outbound packet to the outbound network interface 821.

Figure 1A:
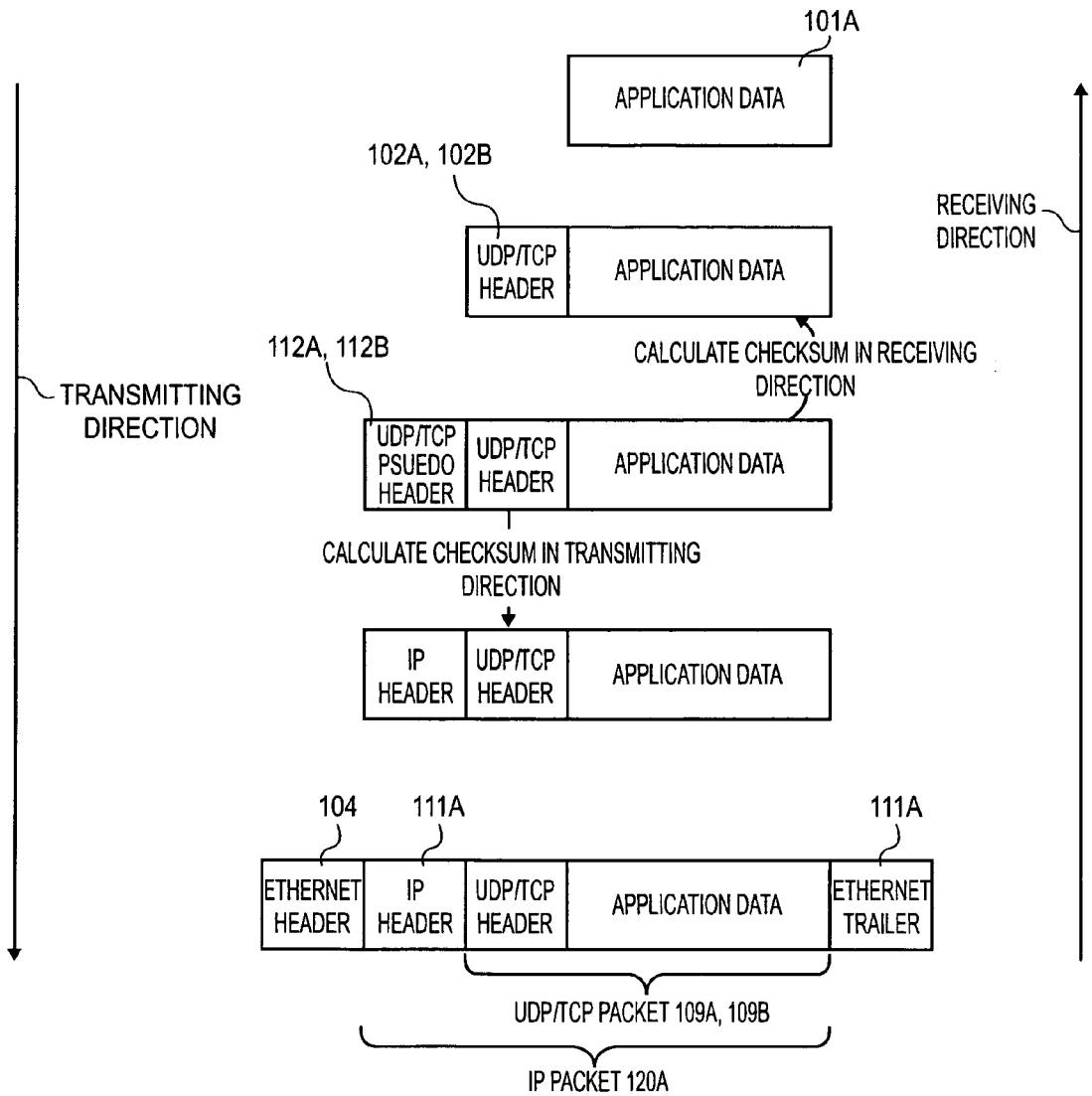
FIG. 1a shows the formation and deconstruction of an IP packet.
Figure 1B:
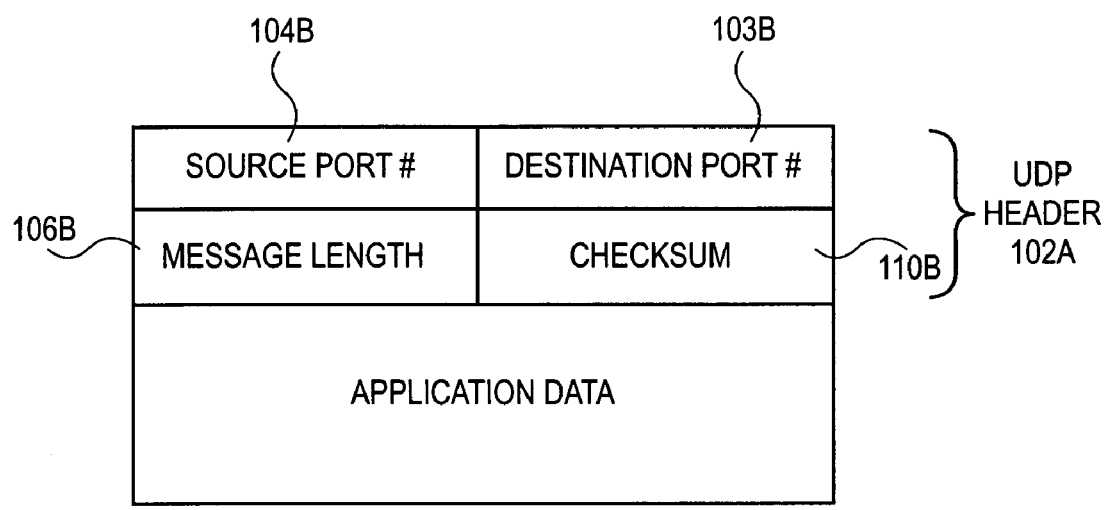
FIG. 1b shows a UDP header and its associated fields.
Figure 1C:
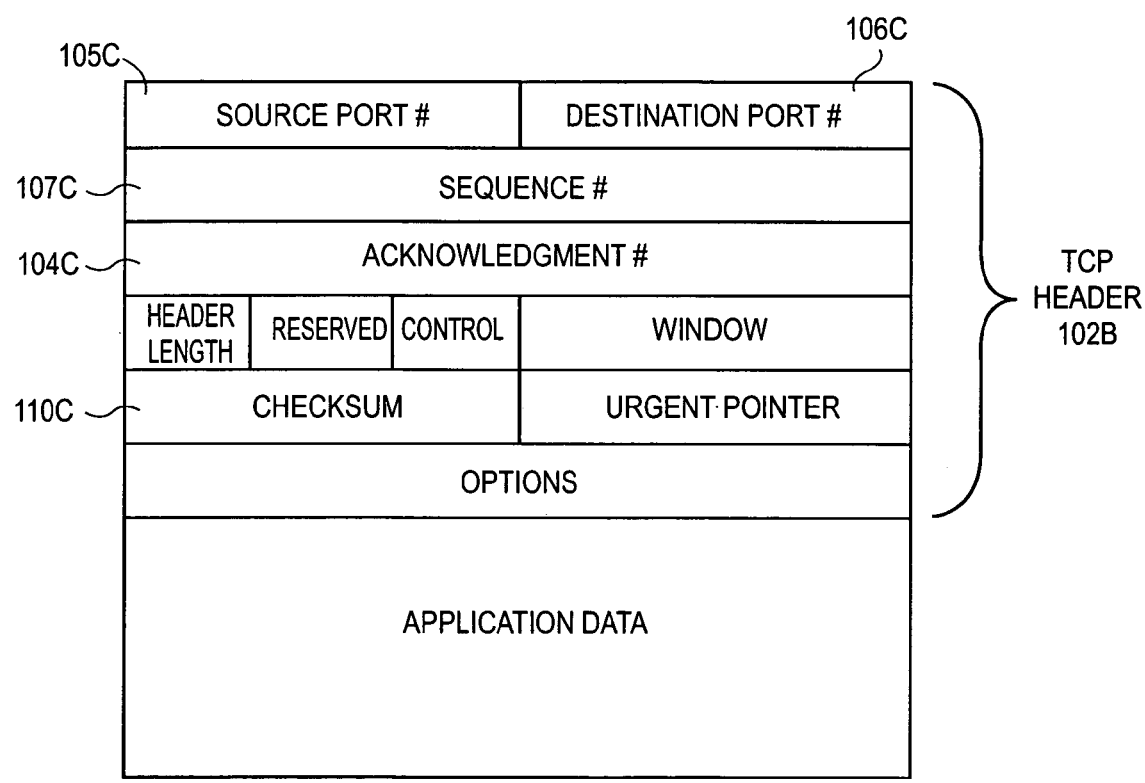
FIG. 1c shows a TCP header and its associated fields.
Figure 1D:
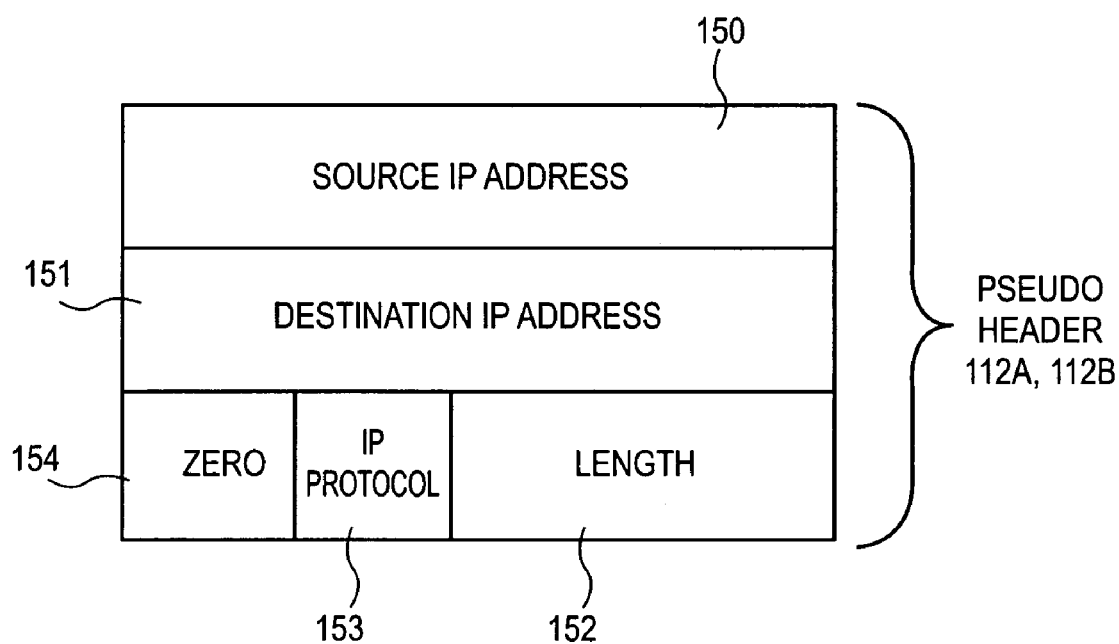
FIG. 1d shows a UDP or TCP pseudo header and its associated fields.
Figure 2:
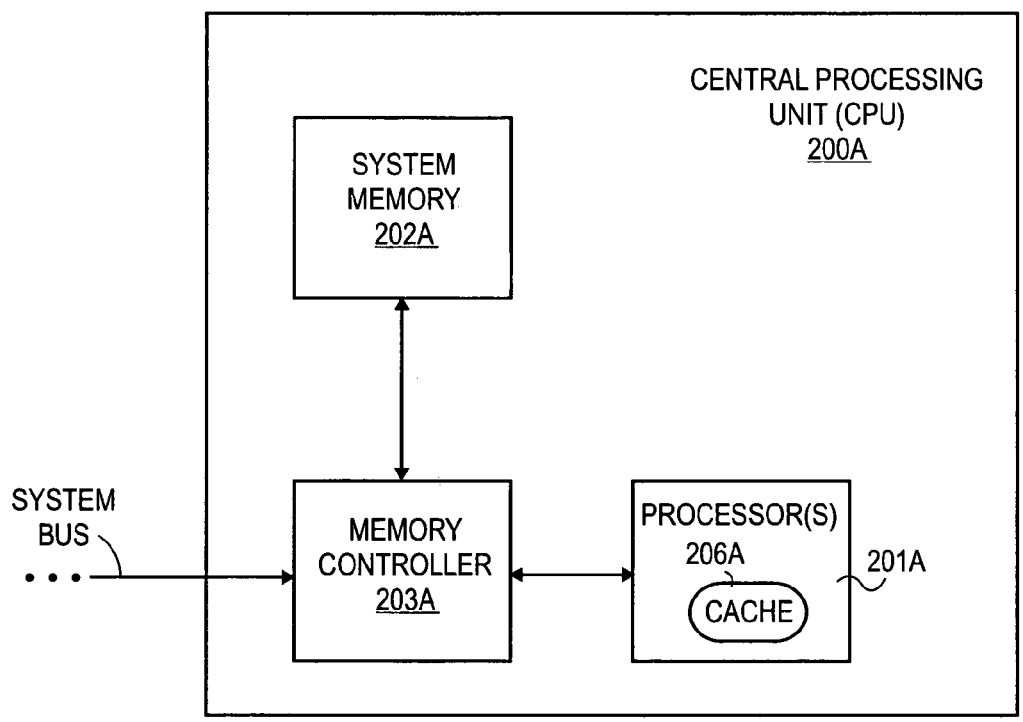
FIG. 2 shows a CPU.

A register 804 may be coupled to the checksum processing and control unit 803 so that the calculated checksum can be calculated and held before it is inserted into the appropriate location in the outbound packet header (e.g., header field 110b of FIG. 1b for UDP packets or header field 110c of FIG. 1c for TCP packets respectively). As described in more detail below, the register 804 may also be used to support a "no-transmit" mode of operation.

Figure 9:
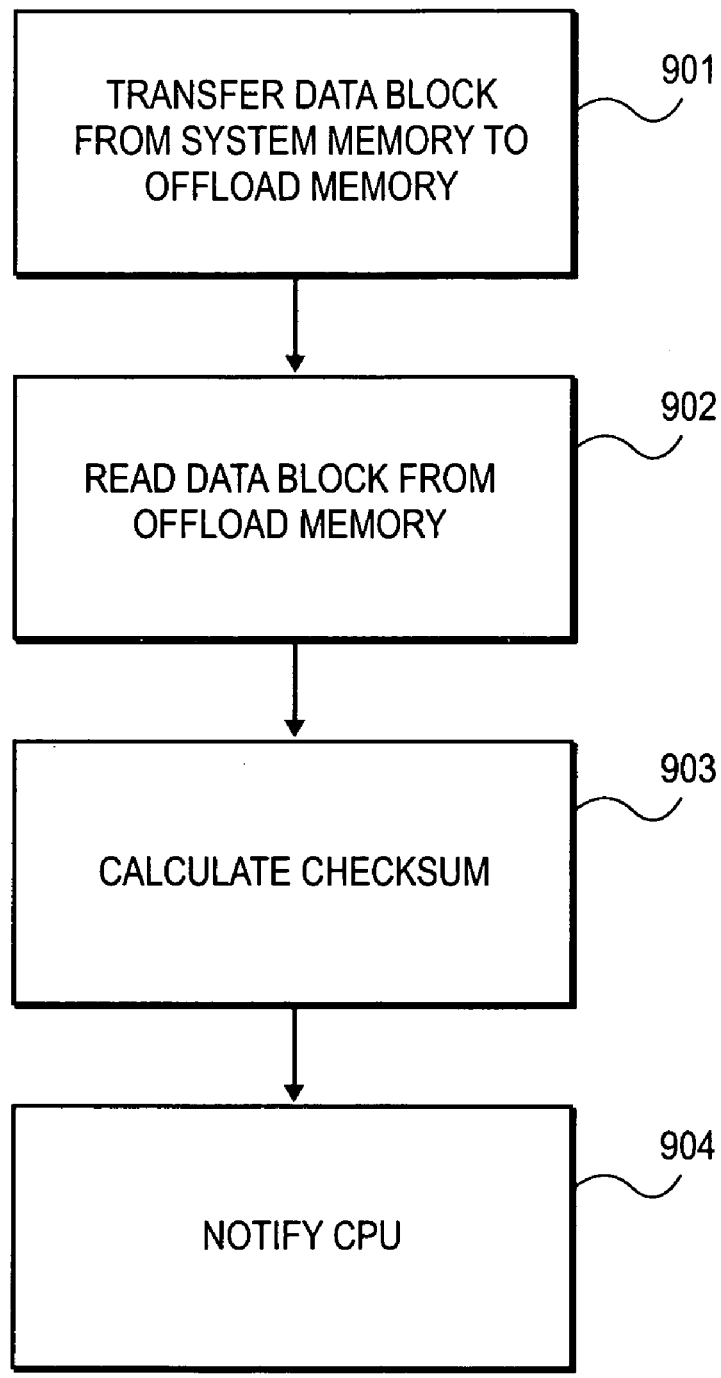
FIG. 9 shows an embodiment of a methodology for calculating a checksum on a block of data.

A "no-transmit" mode of operation, referring back to FIG. 3, can be used to offload "any" checksum calculation process from the CPU 300. That is, the CPU 300 can use the network processing offload unit 310 (e.g., as a form of co-processor) to calculate a checksum on blocks of data that correspond to something other than an inbound packet or an outbound packet. FIG. 9 shows an embodiment of such a methodology.

According to the methodology of FIG. 9, a block of data is transferred 901 from system memory 302 to the network offload memory 309. The block of data is then read 902 from the network offload memory 309 and a checksum on the block of data is calculated 903 by the network processing offload unit 310. The CPU 300 is then notified 904 that the checksum has been calculated. When appropriate, the CPU 300 can retrieve the checksum from the network processing offload unit 310 or; alternatively, the checksum can be provided to the CPU 300 by the network processing offload unit 310.

In an embodiment, an outbound checksum processing engine is used to perform a "no-transmit" checksum. For example, referring back to the embodiment of FIG. 8, the outbound checksum engine 810 shown therein may operate substantially as described above. That is, a block of data (which may or may not be a packet or a section thereof) may be read from the network offload memory (e.g., via a DMA executed by the DMA control and bus interface unit 801) and stored into outbound queue 802. The checksum processing and control unit 803 calculates the checksum for the block of data and stores it into register 803. The CPU is notified that the checksum has been calculated (e.g., via notification line 824). The manner as to how the CPU is notified can correspond to any of those discussed above with respect to the inbound checksum engine embodiment 402 of FIG. 6.

Referring back to FIG. 4, note that a system interface checksum engine 403 is included within the network processing offload unit 410. In an embodiment, the system interface checksum engine 403 is designed to perform checksum calculations of the outbound packet data being transferred from system memory 302 to the network offload memory 309 (referring briefly to FIG. 3). For example, in a further embodiment, the system interface checksum engine 403 performs checksum calculations on outbound UDP packets while the outbound checksum engine 401 performs checksum calculations on outbound TCP packets.

Because UDP packets can be large as compared to supported IP Packet sizes, UDP packets are frequently fragmented (i.e., broken up into pieces) at the IP layer. As such, if the outbound checksum engine 402 is designed to calculate a checksum on an entire packet (as opposed to a series of pieces of a packet), the size of a worst case designed for UDP packet may be too large to efficiently construct an outbound queue 802 and outbound checksum processing and control unit 803. In addition, since a single UDP packet can span multiple IP packets, transmission of the first IP packet typically could not occur until all IP packets encapsulating this UDP packet are transferred to the outbound checksum engine 401. A design point may be conceived that efficiently calculates checksums on entire TCP packets and on pieces of UDP packets. Correspondingly, an embodiment may exist wherein the outbound checksum engine 401 is designed to calculate checksums on entire packets (and is therefore used to calculate the checksum for outgoing TCP packets) and the system interface engine is designed to calculate checksums on pieces of packets (and is therefore used to calculate the checksum for outgoing UDP packets).

Figure 10:
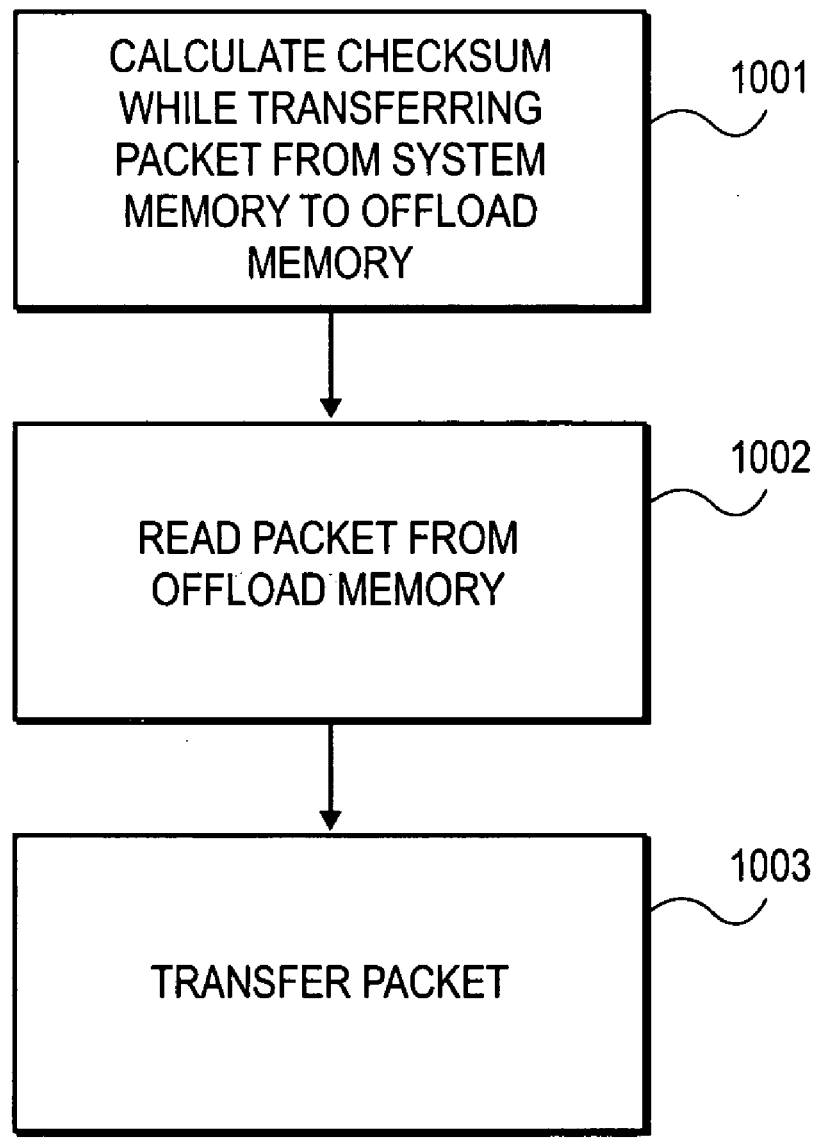
FIG. 10 shows an embodiment of another methodology for calculating a checksum on an outbound packet.

FIG. 10 shows an embodiment of a methodology that describes "on the fly" checksum processing. According to FIG. 10, a checksum is calculated while a packet is being transferred from the system memory to the network offload memory 1001. Referring to FIG. 4, in an embodiment, the packet (or pieces thereof) are received from the system bus (e.g., at system bus interface 408) and forwarded to the system interface checksum engine 403.

As checksums substantially involve the repeated addition of new data to a previous calculated sum, the checksum is continuously calculated as the packet pieces flow through the system interface checksum engine 403. The packet pieces then flow out of the system interface checksum engine 403 (after having been used to update the checksum value) and are subsequently written into the network offload memory 409. With the network offload memory 409 stockpiling the packet pieces, the network offload memory will have a complete packet once all of the packet pieces have flowed through the system interface checksum engine.

Referring to FIGS. 4 and 10, the outbound checksum engine 401 can then retrieve 1002 the outbound packet from the network offload memory 409 and forward it to the outbound network interface 421 for transmission 1003. Referring to the outbound checksum engine embodiment 801 of FIG. 8, note that an outbound packet that has already had its checksum value calculated may effectively bypass the checksum processing and control unit 803 within the outbound checksum engine 801. Signal line 820 of FIG. 8 is drawn to indicate this routing feature.

Figure 11:
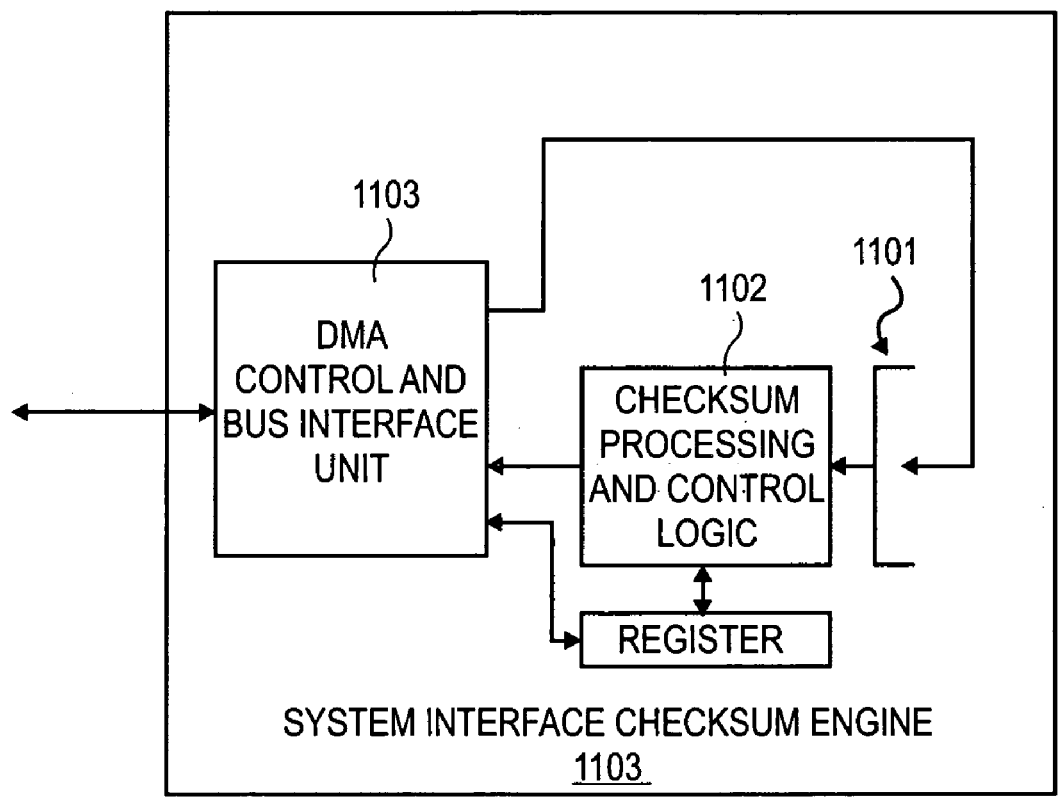
FIG. 11 shows an embodiment of the system interface checksum engine of FIG. 4.

FIG. 11 shows an embodiment of a system interface checksum unit 1103 that can perform checksum calculations concurrently with data transfer as described just above. The packet pieces are received by the DMA control and bus interface unit 1103 and forwarded to an inbound queue 1101. The checksum processing and control unit 1102 calculates the checksum on the packet pieces that are then written into the network offload memory unit (e.g., via a DMA executed by the DMA control and bus interface unit).

Referring back to FIG. 3, note that in the case of outbound packets, regardless if the packet checksum is calculated on the fly or as a whole, the CPU 300 may send a control header to the network offload processing unit 310. The control header may include what type of packet the packet is (e.g., TCP or UDP), how long the packet is, where the packet may found in system memory 302, where the packet is to be stored in network offload memory 309, etc. The control header may be used by the network offload processing unit 310 as needed in order to properly process the packet.

Note that, referring to FIG. 3, most of the above discussion refers to embodiments wherein only checksums are calculated within the network processing offload unit 310; and, the remainder of the IP and TCP or UDP processing burdens are executed by the CPU 300 with software routines. FIG. 12 introduces an alternate embodiment where at least portions of the IP and TCP or UDP processing burdens can be executed by an "offload" processor 1250 (that is included within the networking processing offload unit 1210) so that even more of the processing burden associated with networking protocol implementation can be shifted to the networking processing offload unit 1210.

In this approach, the offload processor 1250 uses the network offload memory 1209 to store: 1) the data units that it operates upon; and, 2) the instruction units that collectively represent the software routine(s) that are executed by the offload processor 1250. The amount of network processing that the offload processor 1250 performs can affect the form of the data passed between the CPU 1200 and the networking offload processing unit 1210.

For example, if the offload processor 1250 performs all (or substantially all) of the networking protocol functionality (e.g., all IP and TCP/UDP related protocols), then (in one embodiment) only application data is passed between the CPU 1200 and the networking processing offload unit 1210 via system bus 1208. In another approach, the software of CPU 1200 is designed to execute TCP/UDP related functionality while the software of offload processor 1250 is designed to perform IP related functionality. In this case, UDP/TCP packets (i.e., application data plus a TCP/UDP header without an IP header) are passed between the CPU 1200 and the networking processing offload unit 1210 via system bus 1208.

In even further alternative approaches, the functional responsibility of the network processing offload unit 1210 and the CPU 1200 may be split in a less clean manner (i.e., in a manner other than a rigid, or intuitive split between the application and transport layers, or networking and transport layers) such that various responsibilities of a common networking layer are executed by both the network processing offload unit 1210 and the CPU 1200. If such approaches are undertaken those of ordinary skill can determine, on a case-by-case basis, the appropriate data format to be passed between the CPU 1200 and network processing offload unit 1210.

Regardless, the term "section of data" may be used to refer to those data pieces that are: 1) passed between the network offload processing unit and the CPU; and, 2) contain information over which the checksum value is calculated. In some cases the entire data region over which the checksum is calculated (i.e., the block of data) may be larger than the section of data. For example, if only application data is passed between the network offload processing unit and the CPU, the term "section of data" refers to the application data even though a UDP or TCP checksum calculation includes the UDP or TCP header (which would be constructed/analyzed within the network offload processor).

In other cases, the block of data over which the checksum is calculated is almost identical to the section of data. For example, in cases where the TCP/UDP header and the application data (i.e., a TCP packet or a UDP packet) are passed between the network offload processor and the CPU, the term "section of data" refers to a TCP packet or a UDP packet. Here, the only difference between the section of data and the block of data over which the checksum is calculated is the pseudo header. Other embodiments are possible as well.

What is claimed is:

1. A network offload acceleration unit, comprising:
   a. a first checksum engine to calculate a first checksum over a first block of data, said first block of data part of a first outbound packet;
   b. a second checksum engine to calculate a second checksum over a second block of data, said second block of data part of a second outbound packet;
   c. a third checksum engine to calculate a third checksum over a third block of data, said third block of data part of an inbound packet wherein said third checksum engine further comprises a queue to receive said third block of data and checksum processing logic circuitry to perform said calculation of said third checksum; and,
   d. a bus coupled to said first outbound checksum engine, said second outbound checksum engine and said inbound checksum engine.

2. The network offload acceleration unit as in claim 1 wherein said first outbound packet comprises a UDP packet, said second outbound packet comprises a TCP packet, and said inbound packet comprises a packet structure selected from the group consisting of:
   a) a UDP packet; and,
   b) a TCP packet.

3. The network offload acceleration unit as in claim 1 wherein said first checksum engine has an output that is communicatively coupled to a network interface.

4. The network offload acceleration unit as in claim 1 wherein said third checksum engine has an input that is communicatively coupled to a network interface.

5. The network offload acceleration unit of claim 1 further comprising an offload memory coupled to said bus.

6. The network offload acceleration unit of claim 1 wherein said network processing offload unit is communicatively coupled to a CPU.

7. The network offload acceleration unit of claim 1 wherein said first checksum engine further comprises a queue to receive said first block of data and checksum processing logic circuitry to perform said calculation of said first checksum.

8. The network offload acceleration unit of claim 7 further comprising a register coupled to said checksum processing logic circuitry.

9. The network offload acceleration unit of claim 8 wherein said register is coupled to said bus.

10. The network offload acceleration unit of claim 7 wherein said second checksum engine further comprises a queue to receive pieces of said second block of data on a piece by piece basis and checksum processing logic circuitry to performs said calculation of said second.

11. The network offload acceleration unit of claim 10 further comprising a register coupled to said checksum processing logic circuitry.

12. An apparatus, comprising:
a. a first checksum engine comprising first logic circuitry to calculate a first checksum over a first block of data, said first block of data part of a first outbound packet;
b. a second checksum engine comprising second logic circuitry to calculate a second checksum over a second block of data, said second block of data part of a second outbound packet wherein said first checksum engine further comprises a queue to store said first block of data and said second checksum engine comprises a queue that can only store a piece of said second block of data as opposed to the entirety of said second block of data, said first outbound packet comprising a TCP packet, said second outbound packet comprising a UDP packet;
c. a third checksum engine comprising third logic circuitry to calculate a third checksum over a third block of data, said third block of data part of an inbound packet; and,
d. a bus coupled to said first outbound checksum engine, said second outbound checksum engine and said inbound checksum engine.

13. The method of claim 12 wherein said third checksum engine is coupled to a network interface and said bus is communicatively coupled to CPU through a memory controller.

14. The apparatus of claim 12 further comprising a memory controller coupled to said bus.

15. The apparatus of claim 14 further comprising a memory coupled to said memory controller.

16. The apparatus of claim 15 further comprising a CPU coupled to said bus.

17. The apparatus of claim 16 wherein said CPU is coupled to said bus through a second memory controller.

18. The apparatus of claim 17 further comprising a second memory coupled to said second memory controller.

19. The apparatus of claim 18 wherein said CPU is coupled to said bus through said second memory controller and a bridge.

* * * * *